United States Patent [19]

Golbeck

[11] Patent Number: 5,239,494

[45] Date of Patent: Aug. 24, 1993

[54] RANDOM BIT STREAM GENERATOR AND METHOD

[75] Inventor: Edmund C. Golbeck, Scottsdale, Ariz.

[73] Assignee: Motorola, Inc., Schaumburg, Ill.

[21] Appl. No.: 785,362

[22] Filed: Oct. 30, 1991

[51] Int. Cl.[5] .......................... G06J 1/00; H04L 9/00
[52] U.S. Cl. ........................................ 364/602; 380/46
[58] Field of Search ............... 364/602, 717; 380/46; 331/78

[56] References Cited

U.S. PATENT DOCUMENTS

| | | |
|---|---|---|
| 3,423,683 | 1/1969 | Kelsey et al. |
| 3,445,591 | 5/1969 | Koehler et al. |
| 3,706,941 | 12/1972 | Cohn .................................... 331/78 |
| 4,176,399 | 11/1979 | Hoffmann et al. ................. 364/717 |
| 4,183,088 | 1/1980 | Simmons ............................ 364/717 |
| 4,355,366 | 10/1982 | Porter ................................. 364/717 |
| 4,513,386 | 4/1985 | Glazer ................................ 364/717 |
| 4,527,798 | 9/1985 | Siekierski et al. ................. 364/717 |
| 4,611,183 | 9/1986 | Piosenka et al. ................ 364/717 X |
| 4,730,265 | 3/1988 | Bjornholt .......................... 364/602 |
| 4,853,884 | 8/1989 | Brown et al. ..................... 364/717 |

*Primary Examiner*—Tan V. Mai
*Attorney, Agent, or Firm*—Jeffrey D. Nehr

[57] ABSTRACT

A random bit stream generator and method including a regulated current source for generating a noise signal, an amplifier coupled to the regulated source for producing an amplified noise signal, a filter coupled to the amplifier for averaging the random bit stream and producing a feedback input, a comparator coupled to the amplifier and the filter for receiving the amplified noise signal and the feedback input and producing a digital signal, a flip-flop coupled to the comparator for receiving the digital signal and for producing the random bit stream, and quick start circuitry coupled to the amplifier, the comparator, and the flip flop for ensuring randomness in the random bit stream from generator start up.

25 Claims, 7 Drawing Sheets

RANDOM BIT STREAM GENERATOR AND METHOD

BACKGROUND OF THE INVENTION

This invention relates in general to the field of generation of random numbers, and in particular to quick start generation of random bit streams for use in electronic data encryption.

Many electronic digital data encrypting devices require a random bit stream. To ensure complete encryption security, no periodic sequence can be used; i.e., a sequence from a standard pseudo-random number generator consisting of shift registers and exclusive-OR gates is not adequate. A completely secure random number generator must use a truly random or non-deterministic data generation technique. Some applications also require the random number generator to operate on no more than 5 volts (V) and to produce random numbers immediately on system start up.

A number of techniques can be used for developing random numbers having non-deterministic statistical properties. Among these are the use of noise from a variety of sources, including zener diodes, gaseous discharges, light-emitting diodes (LEDs), and thermionic diodes. In addition, it may be possible to use the phase jitter of a number of oscillators with a frequency modulation (FM) detector as a source.

Each of the random number generation techniques listed above has limitations, and may not be appropriate for certain applications. The zener diode technique requires controlling the zener bias point and limiter threshold so that the random numbers produced are not skewed toward either ones or zeros. Also, zener diodes in the region of 5 V do not generate noise well, limiting applications of the technique. Gaseous discharges, e.g., neon tubes, generate a relatively low level of noise and require a high voltage and power. LEDs exhibit a large amount of variability, are unpredictable, and do not have a characterized noise ouput. Thermionic diodes require a relatively high voltage and high power. The phase jitter of oscillators technique would involve considerable complexity and a relatively large number of components.

A need exists, therefore, for a method and apparatus for the generation of random numbers where such generation produces usable noise reliably and without requiring a high voltage or high power. The need also exists for a system which can produce a random bit stream upon start-up, without requiring a significant time to produce a random output. It would be desirable if such a system also self-adjusted to prevent producing a skewed distribution toward ones or zeros.

SUMMARY OF THE INVENTION

Accordingly, it is an advantage of the present invention to provide a new and improved method and apparatus for the generation of random bit streams using a reliable source of noise, requiring a relatively low voltage and consuming a relatively small amount of power. It is further an advantage of the present invention to provide a method and apparatus which can produce a random bit stream from start-up and self-adjust to ensure a non-skewed random distribution.

To achieve these advantages, a random bit stream generator and method are contemplated which comprises a regulated source for generating a noise signal, an amplifier coupled to the regulated source for producing an amplified noise signal, a filter coupled to the amplifier for averaging the random bit stream and producing a feedback input, a comparator coupled to the amplifier and the filter for receiving the amplified noise signal and the feedback input and producing a digital signal, a flip-flop coupled to the comparator for receiving the digital signal and for producing the random bit stream, and quick start circuitry coupled to the amplifier, the comparator, and the flip flip for ensuring randomness in the random bit stream from generator start up.

The above and other features and advantages of the present invention will be better understood from the following detailed description taken in conjunction with the accompanying drawings.

DETAILED DESCRIPTION OF THE PREFERRED EMBODIMENT

Figure 1:
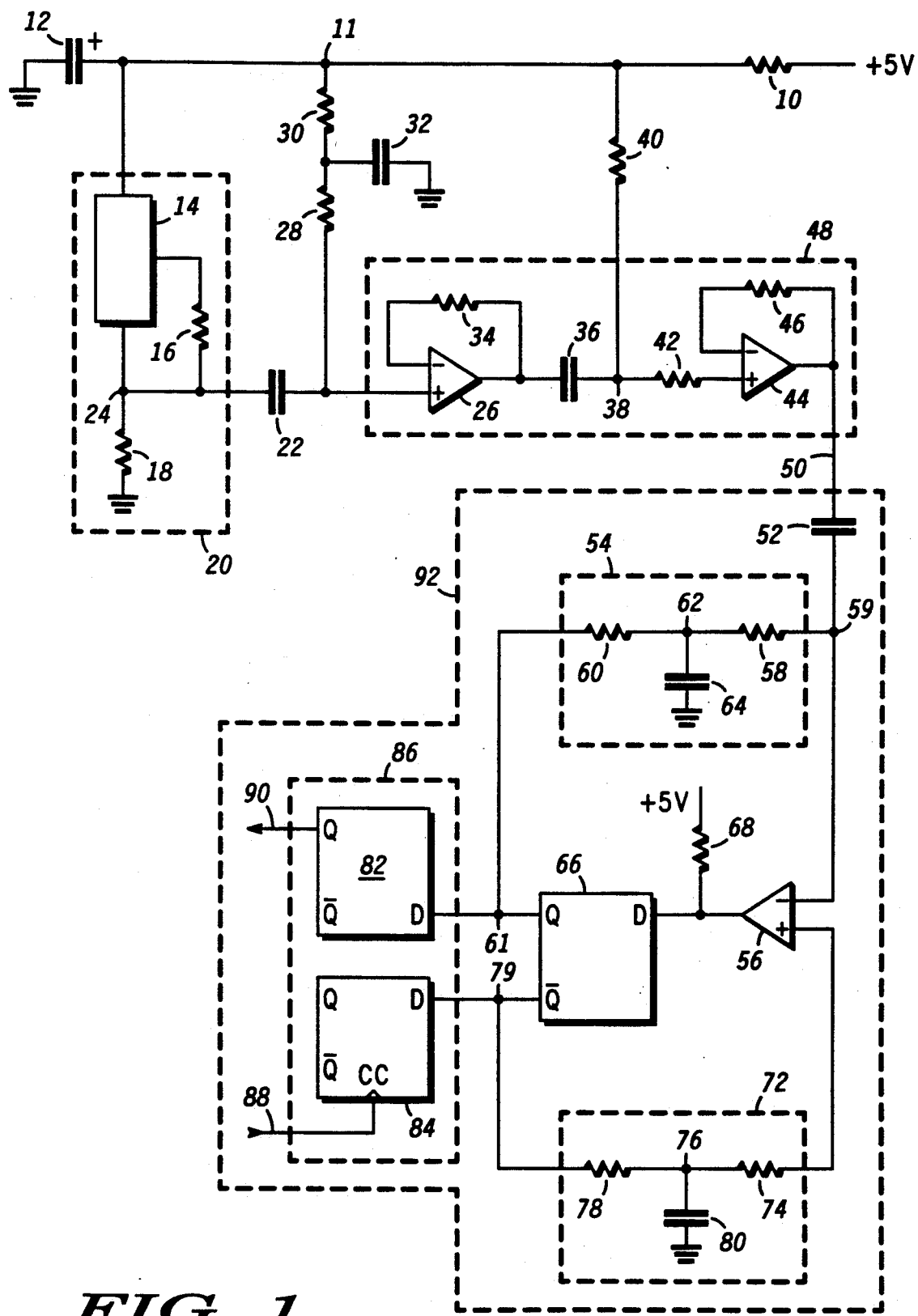
In FIG. 1, there is shown a schematic circuit diagram of a random bit stream generator in accordance with a preferred embodiment of the invention.

FIG. 1 illustrates schematically the circuit diagram of a random bit stream generator in accordance with a preferred embodiment of the invention. The major components of the generator are noise source 20, amplifier stage 48, and noise-to-random bit processor 92.

The random bit stream generator in FIG. 1 requires only 5 V DC. A 5 V DC source is coupled through resistor 10 to junction 11. Junction 11 is coupled through capacitor 12 to electrical ground.

Noise source 20 is coupled to junction 11. Noise source 20 comprises regulated source 14 coupled between junction 11 and junction 24, resistor 16 coupled between regulated source 14 and junction 24, and resistor 18 coupled between junction 24 and electrical ground. Regulated source 14 in this preferred embodiment is a programmable current source, specifically one of the LM 134, LM 234, or LM 334 series from a supplier such as National Semiconductor or Linear Technology. The LM 134, LM 234, and LM 334 differ with respect to their rated temperature ranges (i.e., the LM 134 for military applications will withstand −55 degrees Celsius to +125 degrees Celsius, the LM 234 will withstand −20 degrees Celsius to +80 degrees Celsius, and the LM 334 will withstand 0 degrees Celsius to +70 degrees Celsius). The programmable current source 14 can comprise a current regulator integrated circuit.

Junction 24 is also coupled through capacitor 22 to the positive input of amplifier 26. Junction 11 is coupled through the series combination of resistors 30 and 28 to the positive input of amplifier 26. Capacitor 32 is coupled from the common connection of resistors 30 and 28 to electrical ground.

The output of amplifier 26 is both coupled through capacitor 36 to junction 38 and coupled through feedback resistor 34 to the negative input of amplifier 26. Junction 38 is coupled through resistor 42 to the positive input of amplifier 44. Junction 38 is also coupled through resistor 40 to junction 11.

The output 50 of amplifier 44 is coupled through resistor 46 to the negative input of amplifier 44. The output 50 of amplifier 44 also forms the input to the noise-to-random bit processor 92.

The combination of amplifiers 26 and 44, capacitor 36, and resistors 34, 42, and 46 comprise the amplifier stage 48. Amplifiers 26 and 44 can be Norton-type operational amplifiers for the constant current source 14 of noise source 20.

The FIG. 1 noise-to-random bit processor 92 couples the output 50 through capacitor 52 to junction 59. Junction 59 is coupled through resistor 58 to junction 62. Junction 62 is coupled through capacitor 64 to electrical ground and also through resistor 60 to junction 61. Resistors 58 and 60 and capacitor 64 comprise RC low pass filter 54.

The output 50 is also coupled to the negative input of comparator 56. The 5 V source is coupled through resistor 68 to the output of the comparator 56. The output of the comparator 56 is coupled to the D input of flip-flop 66.

The positive input of comparator 56 is coupled through resistor 74 to junction 76. Junction 76 is coupled through capacitor 80 to electrical ground and also through resistor 78 to junction 79. Resistors 74 and 78 and capacitor 80 comprise RC low pass filter 72.

The Q output of flip-flop 66 is coupled to junction 61 and the D input of data flip-flop 82. The complement of Q output (denoted as Q with a bar over the letter) is coupled to junction 79 and the D input of flip-flop 84. Clock 88 is input into flip-flop 84. Flip-flops 82 and 84 comprise buffer stage 86. The Q output of flip-flop 82 comprises the random bit output 90.

A representative set of component values for the random bit stream generator (and the quick-start variations in the additional figures) can be found in the Table of Component Values given below.

| TABLE OF COMPONENT VALUES | |
|---|---|
| Component | Value |
| Resistor 10 | 68 Ω |
| Capacitor 12 | 4.7 μF |
| Resistor 18 | 2700 Ω |
| Capacitor 22 | 0.1 μF |
| Resistors 28 and 30 | 100 kΩ |
| Capacitor 32 | 0.1 μF |
| Resistor 34 | 100 kΩ |
| Capacitor 36 | 0.1 μF |
| Resistor 40 | 200 kΩ |
| Resistor 42 | 2000 kΩ |
| Resistor 46 | 100 kΩ |
| Capacitor 52 | 0.1 μF |
| Resistor 58 | 10 kΩ |
| Resistor 60 | 100 kΩ |
| Capacitor 64 | 1 μF |
| Resistor 68 | 2700 Ω |
| Resistor 74 | 10 kΩ |
| Resistor 78 | 100 kΩ |

-continued

| TABLE OF COMPONENT VALUES | |
|---|---|
| Component | Value |
| Capacitor 80 | 1 μF |
| Capacitor 100 | 0.1 μF |
| Resistor 104 | 10 kΩ |
| Resistor 108 | 100 kΩ |
| Capacitor 112 | 1 μF |
| Resistor 124 | 10 kΩ |
| Resistor 126 | 100 kΩ |
| Capacitor 128 | 1 μF |
| Resistor 140 | 10 kΩ |
| Capacitor 142 | 0.022 μF |
| Capacitor 200 | 0.1 μF |
| Resistor 204 | 10 kΩ |
| Resistor 208 | 100 kΩ |
| Capacitor 212 | 1 μF |
| Resistor 224 | 10 kΩ |
| Resistor 226 | 100 kΩ |
| Capacitor 228 | 1 μF |
| Resistor 240 | 10 kΩ |
| Capacitor 242 | 0.022 μF |

In operation of the circuit shown in FIG. 1, the current exiting current source 14 in FIG. 1 at junction 24 is composed of both a DC and an AC noise component. Because of the low impedance looking into the input of amplifier 26, virtually all of the noise component goes through capacitor 22 and into the positive input of amplifier 26. The DC component flows through resistor 18 to electrical ground and is not used in the noise generation process.

Amplifiers 26 and 44 can be Norton-type amplifiers in which the input current to the amplifier is mirrored in the output feedback. A filtered bias current through resistors 28 and 30 and through resistor 40 sets amplifiers 26 and 44 to their proper operating point. The voltage out of amplifier 26 is equal to the noise current times the feedback resistor 34 value and is fed into the positive input of amplifier 44 to result in an output 50 of approximately 1 V peak-to-peak of noise.

Comparator 56 and flip-flop 66 are the elements that directly generate the data stream. Flip-flops 82 and 84 serve as a buffer and balance the load on flip-flop 66. To understand the FIG. 1 bit generation operation, consider that flip-flop 66 is being clocked and has been producing data pulses at the Q and complement of Q outputs of flip-flop 66. Consider that the Q and complement of Q outputs have been producing bitstream outputs which each average 50% ones and 50% zeros. The low pass filter 72 will have averaged the complement of Q output to a level of one-half the sum of the high and low voltage levels (i.e., 0.5(5 V DC+0V DC)=2.5 V DC in this preferred embodiment). This reference voltage level is impressed on the positive input of comparator 56.

Similarly, the negative input of comparator 56 has 2.5 V DC impressed upon it because low pass filter 54 will have averaged the high and low voltage levels of the Q output to 2.5 V DC. In addition, the negative input of comparator 56 has the noise output 50 impressed on it. Thus, the noise voltage from output 50 instantaneously adds or subtracts from the reference voltage level, depending on the instantaneous value of the noise. The output of comparator 56 thus swings high or low depending on the instantaneous value of the noise. When a rising clock edge is received by flip-flop 66, flip-flop 66 transfers the output of comparator 56 at that instant to the Q output of flip-flop 66 (and the complement to the complement of Q output). The flip-flop 66 Q output and complement of Q output are held unchanged by flip-flop 66 until the next rising clock edge, where they may change if the output of comparator 56 is changed at that instant. If the output of comparator 56 remains unchanged at the next rising clock edge, the comparator 56 output, and, therefore, the flip-flop 66 Q output and complement of Q output remain unchanged.

The bit stream data generator is self adjusting, because if there are too many ones produced at the Q output of flip-flop 66 (and, therefore, too few ones at the complement of Q output), the reference voltage produced by the complement of Q output and low pass filter 72 will decrease. Such a decrease will cause the noise to spend more time in favor of the negative input to comparator 56, which causes more lows at the comparator 56 output, which causes fewer ones at the Q output of flip-flop 66, thereby compensating for the initial imbalance.

Flip-flops 82 and 84 equally load the output of flip-flop 66 for balance. Flip-flop 82 also serves as a buffer to prevent users of the random bit stream 90 from disturbing the generation process by loading.

Figure 2:
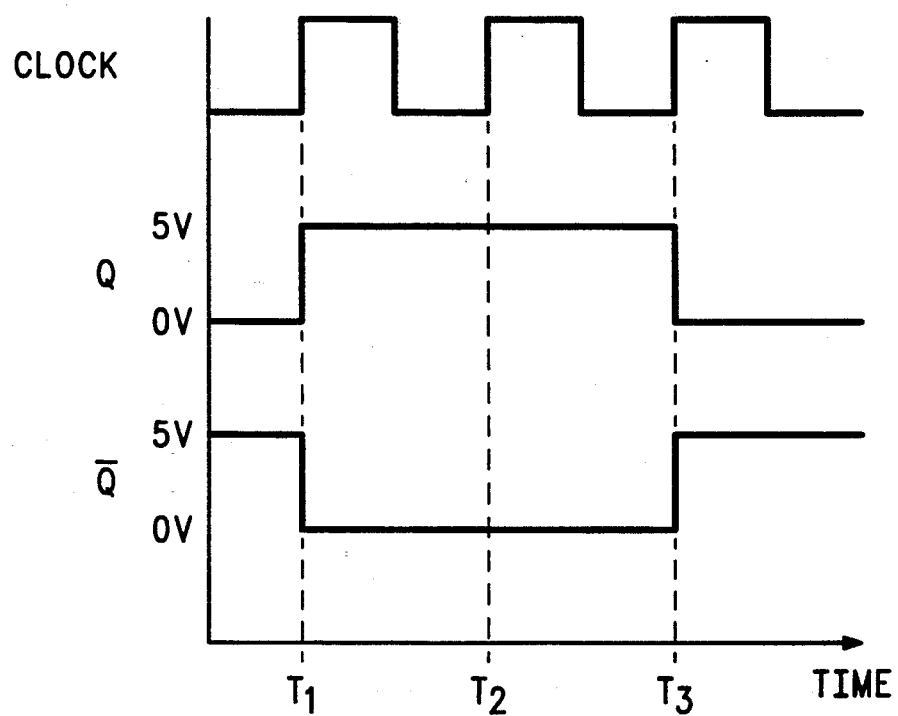
In FIG. 2, there is shown a diagram of the clock pulse input and the output of the random bit stream generator shown in FIG. 1.

FIG. 2 shows a diagram of the clock pulse input and the output of the random bit stream generator shown in FIG. 1. The periodic clock pulses have leading edges which occur at times $T_1$, $T_2$, and $T_3$ as shown in FIG. 2. The Q output and the complement of Q output of flip-flop 66 may change only on the clock pulse leading edges. As shown in FIG. 2, an example of a random bit stream has the Q output of flip-flop 66 changing from "low" to "high", i.e., from 0 V to 5 V at time $T_1$. Simultaneously, the complement of Q output of flip-flop 66 transitions from "high" to "low", i.e., 5 V to 0 V at $T_1$.

In the particular example represented in FIG. 2, the output of comparator 56 remains unchanged at the next rising clock edge, i.e., at time $T_2$, and the comparator 56 output, and, consequently the Q output and complement of Q output of flip-flop 66 remain unchanged. At the third rising clock edge shown in FIG. 2, however, the comparator 56 output has changed and thus the Q output and the complement of Q output of flip-flop 66 change from 5 V to 0 V and 0 V to 5 V, respectively, as a consequence. The example in FIG. 2 does not imply that a change occurs at every other rising clock edge. On every rising clock edge, there is a 50% probability that the Q output and complement of Q output will remain the same and a 50% probability that the Q output and complement of Q output will switch.

Figure 3A:
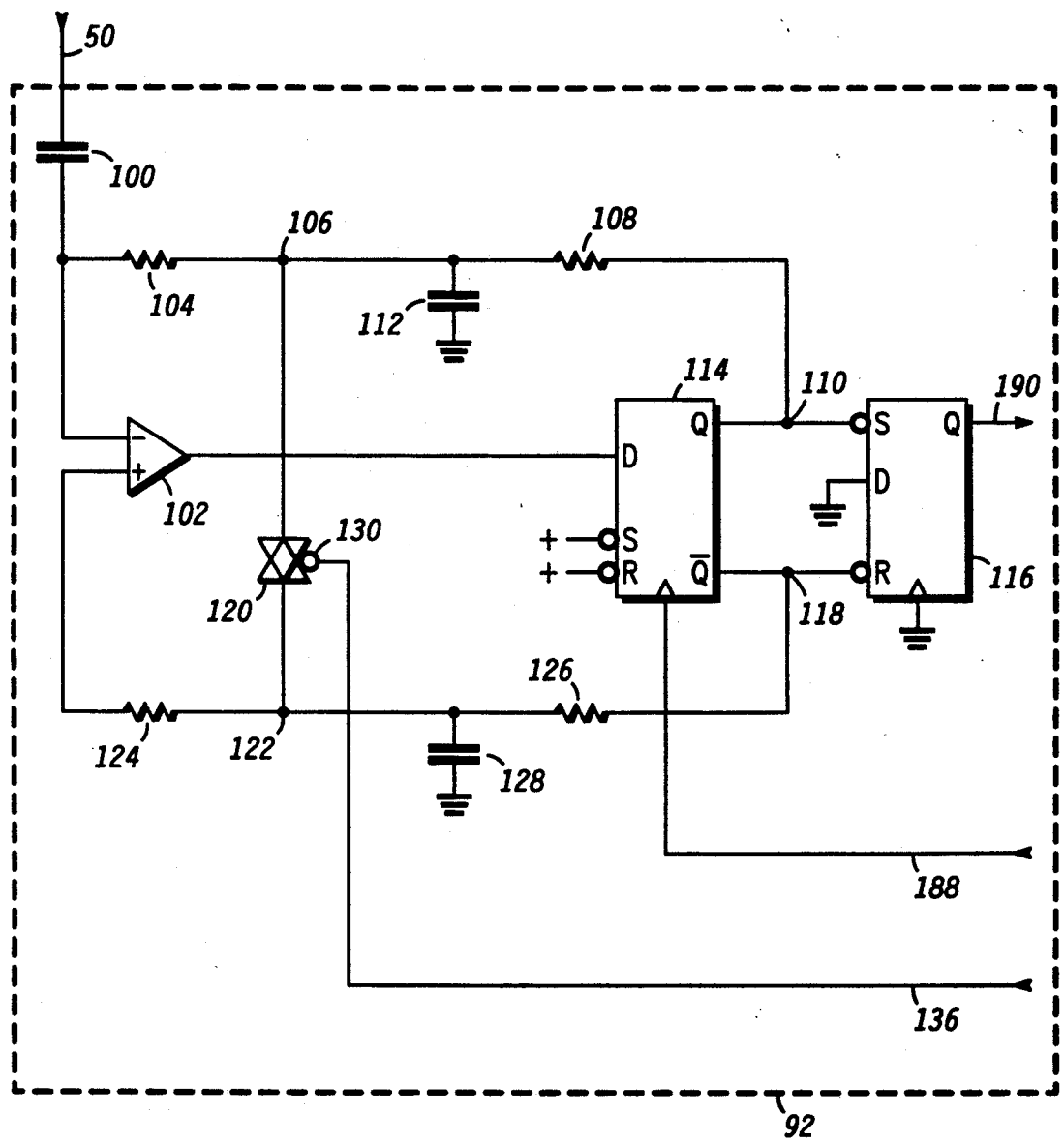
In FIG. 3A, there is shown a first quick-start circuit variation of the noise-to-random bit processor of FIG. 1.

FIG. 3A illustrates a first quick-start circuit variation of the noise-to-random bit processor 92 of FIG. 1. Noise output 50 is input through capacitor 100 to the negative input of comparator 102. The negative input of comparator 102 is also coupled through resistor 104 to junction 106. Junction 106 is coupled through capacitor 112 to electrical ground and through resistor 108 to junction 110. Junction 106 is also coupled through analog gate 120 to junction 122. External control line 136 is coupled to port 130 of analog gate 120.

The positive input to comparator 102 is coupled through resistor 124 to junction 122. Junction 122 is coupled through capacitor 128 to electrical ground. Junction 122 is also coupled through resistor 126 to junction 118.

The output of comparator 102 is coupled to the D input of flip-flop 114. The S and the R inputs to flip-flop 114 are connected to the 5 V source. The clock input port of flip-flop 114 is coupled to the clock input 188. The Q output of flip-flop 114 is coupled to junction 110 and to the S input of flip-flop 116. The complement of Q output of flip-flop 114 is coupled to junction 118 and to the R input of flip-flop 116. The D input of flip-flop 116 is connected to electrical ground. The clock of flip-flop 116 is connected to electrical ground. The Q output of flip-flop 116 provides the output random bit stream 190.

The need for the first quick start circuit and method can be described as follows. In the FIG. 1 circuit described, the clock is required to maintain the statistical properties of the digital noise out of the comparator. If the clock stops, or is gated off during the operation of the FIG. 1 circuit, flip-flops 66, 82, and 84 will remain unchanged, i.e., be held fixed with unchanging Q and complement of Q outputs. With the Q outputs of flip-flops 66, 82 and 84 held in one state, one of either capacitor 64 or 80 will charge to 5 V DC and the other to 0 V. Given such a voltage imbalance input to the positive and negative inputs of comparator 102 when the clock resumes, perhaps thousands of bits of the same sign will be output from the Q output 90 of flip-flop 82 before the FIG. 1 circuit self adjusts as described above. Complete self-adjustment to equal DC voltage inputs to both the positive and negative inputs of comparator 102 are required for steady state operation and the circuit to produce statistically random data.

The importance of the first quick start circuit and method is as follows. The FIG. 3A circuit uses analog gate 120 to connect the filter capacitors 128 and 112 at junctions 122 and 106, respectively, to achieve equal DC voltage input to the positive and negative inputs of comparator 102 when the clock is off. With the system off (i.e., the clock turned off), either the Q output or the complement of Q output of flip-flop 114 is high (and the other low) and both capacitors 112 and 128 will be at 2.5 V DC because analog gate 120 conducts. In such a configuration, capacitors 112 and 128 experience the same DC voltage as during steady state operation.

On resumption of the clock (the system is turned on) from such a configuration, analog gate 120 disconnects junctions 106 and 122 with a signal from the external control line 136 and random data starts with the first clock pulse.

Figure 3B:
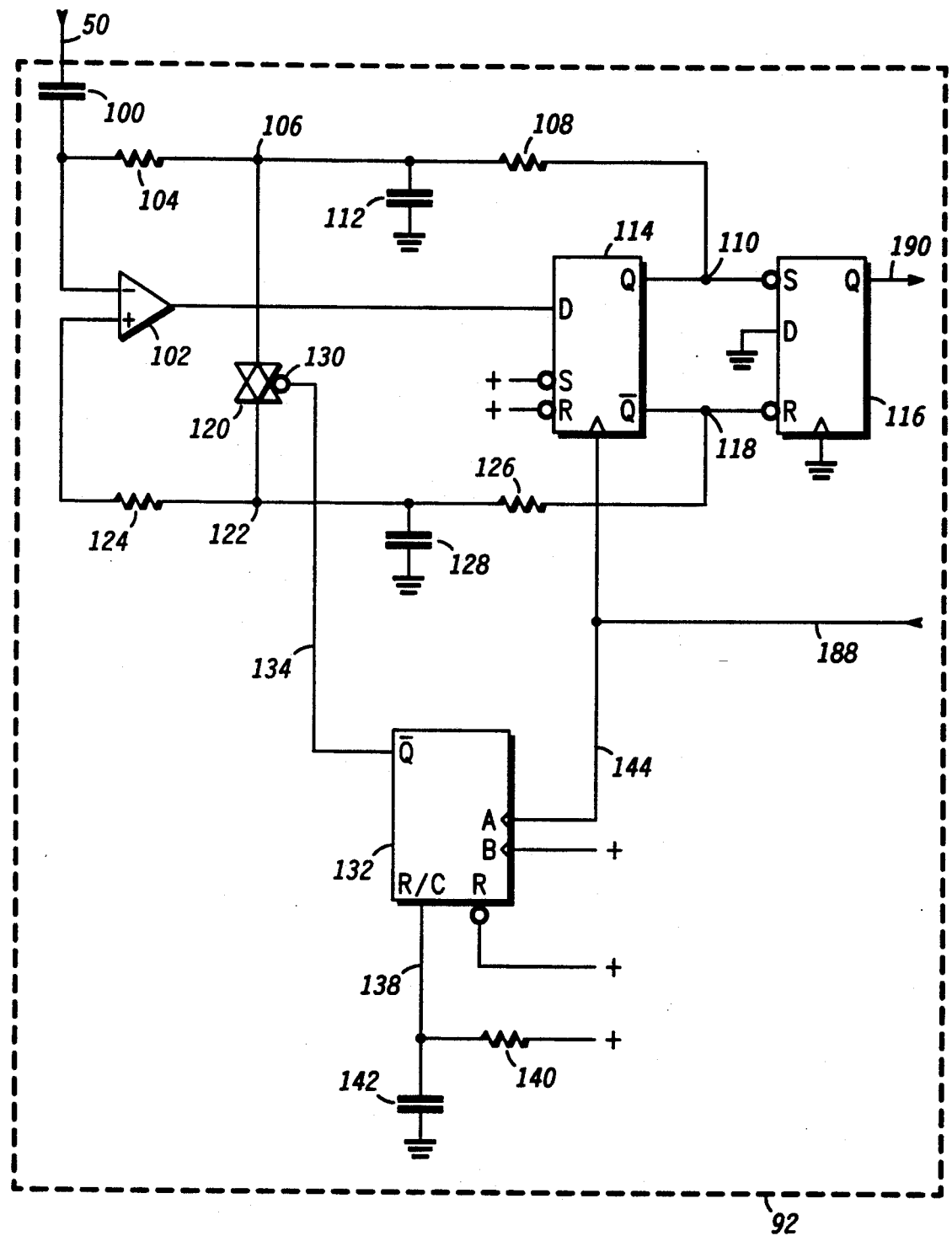
In FIG. 3B, there is shown an alternate embodiment of the first quick-start circuit variation of the noise-to-random bit processor of FIG. 3A.

FIG. 3B illustrates an alternative embodiment to the first quick-start circuit variation of FIG. 3A. The structure and function of the FIG. 3B embodiment are the same as for the FIG. 3A version, with the exception that activation of the analog gate 120 port 130 is accomplished through the use of monostable device 132.

Monostable 132 has a complement of Q output coupled to control line 134, A port 144 coupled to clock input 188, B and R ports coupled to the 5 V source, and an R/C port coupled through both resistor 140 to the 5 V source and through capacitor 142 to electrical ground.

The importance of the monostable 132 in the alternate embodiment of the first quick start circuit and method in FIG. 3B is as follows. As in the description of the operation of the circuit of FIG. 3A, the circuit in FIG. 3B uses analog gate 120 to connect the filter capacitors 128 and 112 at junctions 122 and 128, respectively, to achieve equal DC voltage input to the positive and negative inputs of comparator 102 when the clock is off. With the system off (i.e., the clock turned off), either the Q output or the complement of Q output of flip-flop 114 is high (and the other low) and both capacitors 112 and 128 will be at 2.5 V DC. In such a configuration, capacitors 112 and 128 experience the same DC voltage as during steady state operation.

On resumption of the clock when the system is turned on from such a configuration, analog gate 120 disconnects junctions 106 and 122 with the release of analog switch line 134 by the complement of Q output of monostable device 132, and random data starts with the first clock pulse. The retriggerable monostable 132 is not triggered to release analog gate 120 through analog switch line 134 unless monostable 132 stops receiving clock pulses. The monostable 132 switches its Q and complement of Q outputs only if no clock pulses are received by monostable 132 for a time longer than the characteristic time constant represented by resistor 140 and capacitor 142. Since the resistor 140 and capacitor 142 time constant is designed to exceed the clock pulse period, monostable 132 does not cause the analog gate 120 to conduct unless the clock is turned off.

Figure 4A:
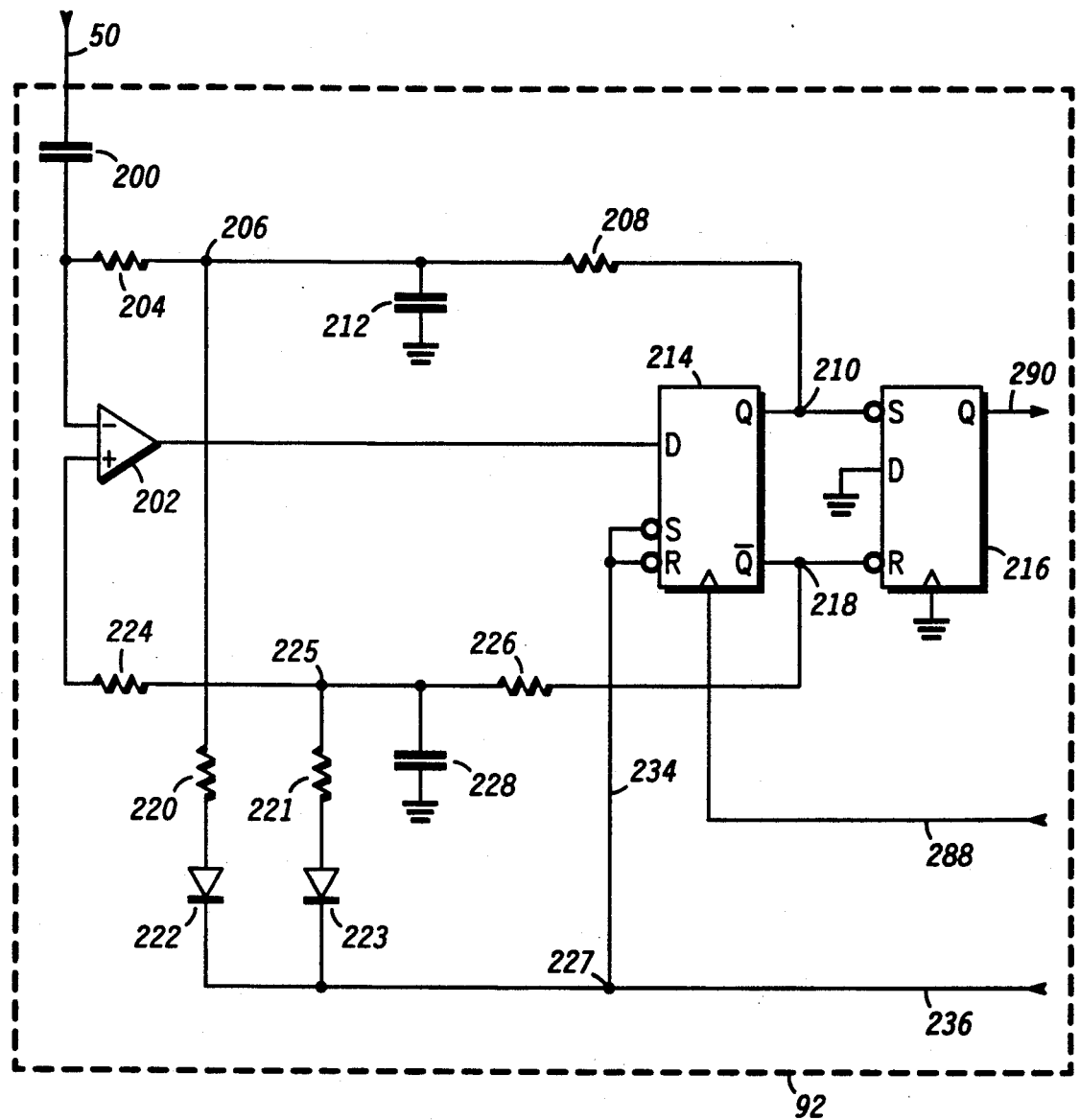
In FIG. 4A, there is shown a second quick-start circuit variation of the noise-to-random bit processor of FIG. 1.

FIG. 4A illustrates a second quick-start circuit variation of the noise-to-random bit processor 92 of FIG. 1. Noise output 50 is input through capacitor 200 to the negative input of comparator 202. The negative input of comparator 202 is also coupled through resistor 204 to junction 206. Junction 206 is coupled through capacitor 212 to electrical ground and through resistor 208 to junction 210. Junction 206 is also coupled through the series combination of resistor 220 and diode 222 to junction 227. Junction 223 is coupled to junction 227. Control line 234 is coupled to both the S and R inputs of flip-flop 214 and to junction 227. External control 236 is coupled to junction 227.

The positive input to comparator 202 is coupled through resistor 224 to junction 225. Junction 225 is coupled through capacitor 228 to electrical ground. Junction 225 is coupled through resistor 226 to junction 218. Junction 225 is also coupled through the series combination of resistor 221 and diode 223 to junction 227.

The output of comparator 202 is coupled to the D input of flip-flop 214. The clock input port of flip-flop 214 is coupled to the clock input 288. The Q output of flip-flop 214 is coupled to junction 210 and to the S input of flip-flop 216. The complement of Q output of flip-flop 214 is coupled to junction 218 and to the R input of flip-flop 216. The D input of flip-flop 216 is connected to electrical ground. The clock of flip-flop 216 is connected to electrical ground. The Q output of flip-flop 216 provides the output random bit stream 290.

Flip-flop 214 in FIG. 4A has the specific property that when both the "Set" (S) and "Reset" (R) inputs of the flip-flop are pulled "low", i.e., to 0 V, both the Q and complement of Q outputs of flip-flop 214 go "high", i.e., to 5 V. As an example, flip-flop 214 could be a 74HC74 flip-flop which has this particular property. External control 236, through control line 234, can be used to pull the S and R inputs of flip-flop 214 low simultaneously.

With both the Q and complement of Q outputs of flip-flop 214 high, capacitors 212 and 228 would normally be charged to 5 V. However, the external control 236 also connects to junction 227, which connects the series combination of resistor 220 and diode 222 to the non-ground side of capacitor 212 and which connects the series combination of resistor 221 and diode 223 to the non-ground side of capacitor 228. With approximately 0.5 V voltage drop across diodes 222 and 223, plus the voltage drop across resistors 220 and 221, capacitors 221 and 228 are charged to a potential of 2.5 V DC, virtually the same as during steady state operation. Therefore, random data can start with the first clock.

Figure 4B:
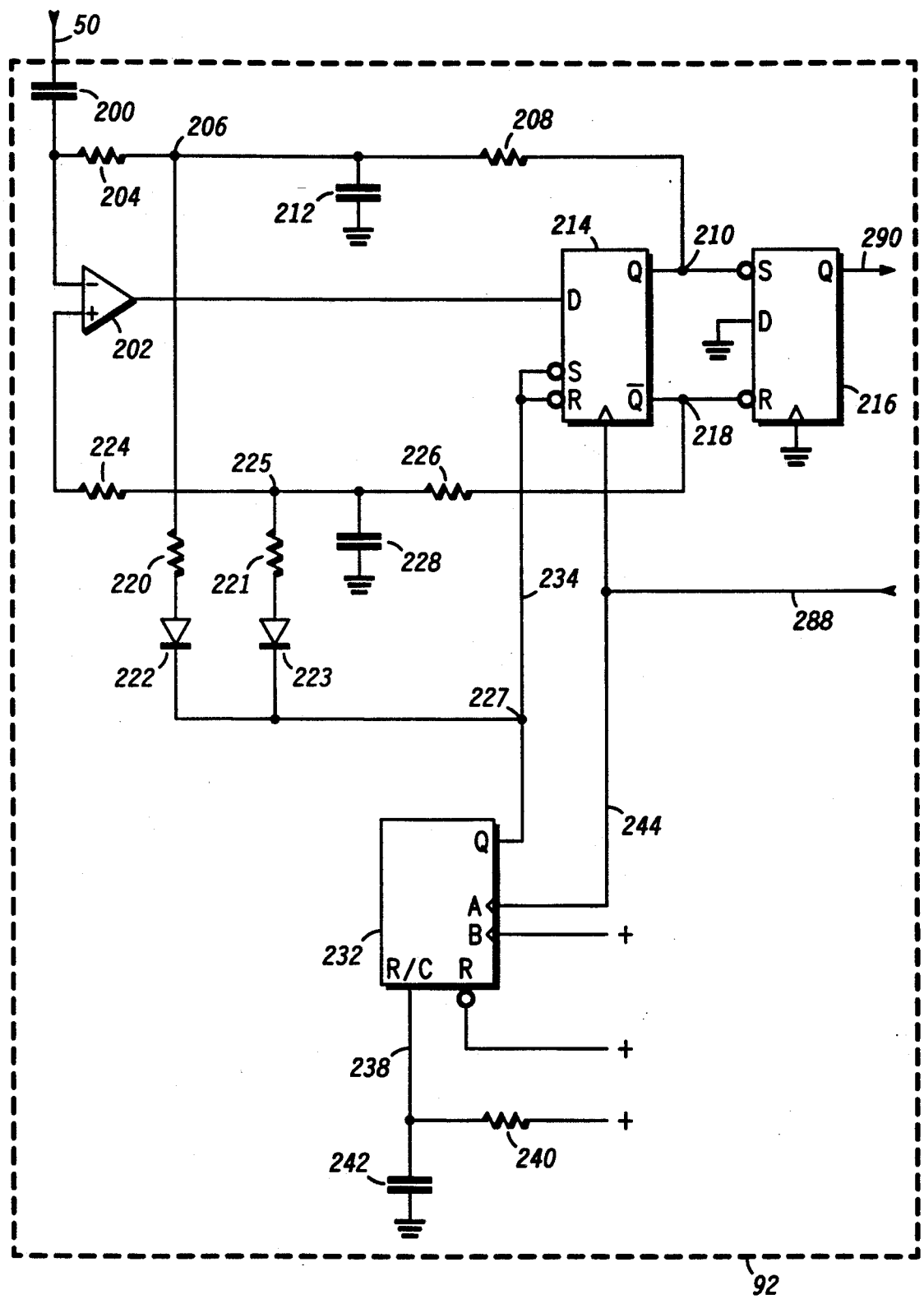
In FIG. 4B, there is shown an alternate embodiment of the second quick-start circuit variation of the noise-to-random bit processor of FIG. 4A.

FIG. 4B illustrates an alternative embodiment of the second quickstart circuit variation of the noise-to-random bit processor 92 of FIG. 4A. The structure and function of the FIG. 4B embodiment are the same as for the FIG. 4A version, with the exception that activation of the quick start capability is accomplished through the use of monostable device 232, rather than through an external control.

Monostable 232 has a Q output coupled to junction 227, A port 244 coupled to clock input 288, B and R ports coupled to the 5 V source, and an R/C port coupled through both resistor 240 to the 5 V source and through capacitor 242 to electrical ground.

As was the case in FIG. 4A, flip-flop 214 in FIG. 4B has the specific property that when both the "Set" (S) and "Reset" (R) inputs of the flip-flop are pulled "low", i.e., to 0 V, both the Q and complement of Q outputs of flip-flop 214 go "high", i.e., to 5 V. In the circuit of FIG. 4B, the Q output of monostable device 232 is used to pull the S and R inputs of flip-flop 214 low simultaneously. Then, as described previously in the case of FIG. 4A, capacitors 221 and 228 are charged to a potential of 2.5 V DC, virtually the same as during steady state operation. When the monostable 232 has a low Q output, diodes 222 and 223, each with its cathode toward junction 227, are forward biased and conduct. Therefore, random data can start with the first clock.

Figure 5:
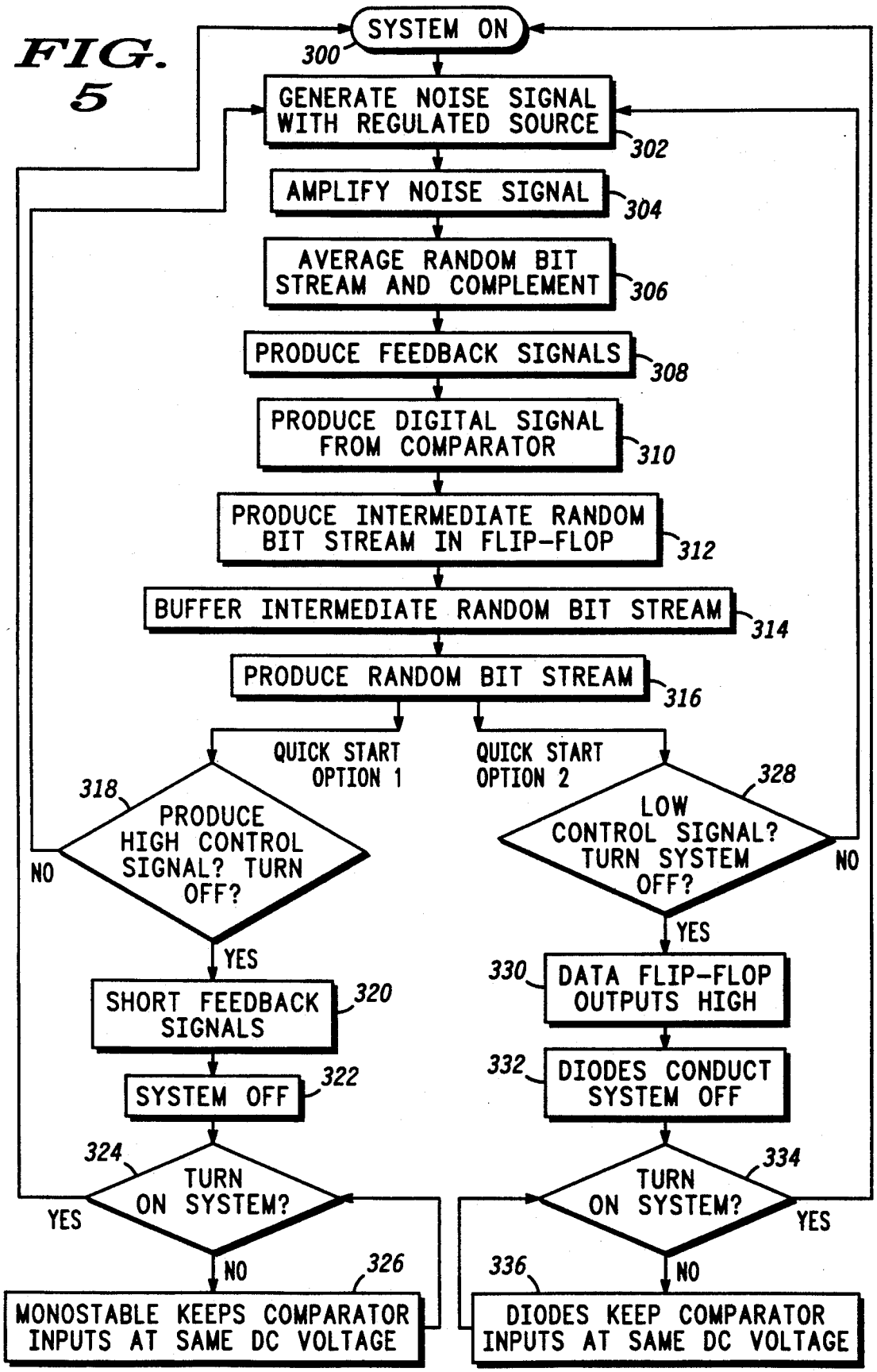
In FIG. 5, there is shown a flowchart of the method of the random bit stream generator and the first and second quick start variations.

FIG. 5 illustrates a flowchart of the method of the random bit stream generator and the first and second quick start variations. Although both quick start variations are shown within the FIG. 5 flowchart, only one quick start method of the two would be necessary for any given application.

In operation, as shown in FIG. 5, the random bit stream generator would first be turned on, as shown in Box 300. A regulated source is used to generate a noise signal, as shown in box 302. The noise signal is amplified, as shown in box 304, and both the random bit stream and the complement of the random bit stream are averaged to produce an average signal. Feedback signals are also produced, as shown in box 308. The comparator, as listed in box 310, produces a digital signal. Box 312 shows the production of an intermediate random bit stream, which is buffered in box 314. Box 316 shows the final random bit stream entering one of two quick start paths.

FIG. 5 shows the first quick start option 1 which requires the production of a high control signal, as shown in box 318. If the high control signal does not occur, noise continues to be generated, with the flowchart proceeding to box 302 via the NO path. If a high control signal does occur, however, the feedback signals are electrically shorted together, as shown in box 320 via the YES path, and the noise generator system is off, as shown in box 322. If the first quick start option is restarted, the flowchart proceeds via the YES path from box 324 to box 300, and noise generation follows. If the system is not engaged (the NO path from box 324), the monostable keeps the comparator inputs at the same DC voltage, as shown in box 326. From box 326, the noise generator system returns to box 324, waiting for the system to be turned on.

FIG. 5 shows the second quick start option which requires production of a low control signal, as shown in box 328. If the low control signal does not occur, noise continues to be generated, with the flowchart proceeding to box 302 via the NO path. If a low control signal does occur, however, the data flip-flop outputs become high, as shown in box 330 (proceeding on the YES path from box 328), and the diode networks conduct, as shown in box 332. If the second quick start option is restarted, the flowchart proceeds via the YES path from box 334 to box 300, and noise generation follows. If the quick start second option is not engaged (the NO path from box 334), the diodes keep the comparator inputs at the same DC voltage, as shown in box 336. From box 336, the noise generator system returns to box 334 waiting for the system to be turned on.

Thus, there has been described a random bit stream generator and method which overcomes specific problems and accomplishes certain advantages relative to prior art methods and mechanisms. The improvements are significant. The method and apparatus for the generation of random numbers produces usable noise predictably and without requiring a high voltage or high power. The method and apparatus can also produce a random bit stream from start-up, without requiring a significant time to produce a random output. The method and apparatus are also self-adjusting to prevent the generator from producing a skewed distribution toward ones or zeros.

Thus, there has also been provided, in accordance with an embodiment of the invention, a random bit stream generator and method which overcomes specific problems and accomplishes certain advantages and which fully satisfies the aims and advantages set forth above. While the invention has been described in conjunction with a specific embodiment, many alternatives, modifications, and variations will be apparent to those of ordinary skill in the art in light of the foregoing description. Accordingly, the invention is intended to embrace all such alternatives, modifications, and variations as fall within the spirit and broad scope of the appended claims.

What is claimed is:

1. A generator for producing a random bit stream comprising:
   regulated source means for generating a noise signal;
   amplifier means for producing an amplified noise signal from the noise signal, the amplifier means coupled to the regulated source means;
   comparator means for receiving the amplified noise signal and a feedback input and producing a comparator output signal, the comparator means coupled to the amplifier means;
   flip-flop means for receiving the comparator output signal and for producing a random bit stream, the flip-flop means coupled to the comparator means; and
   filter means for averaging the random bit stream and producing the feedback input, the filter means coupled to the amplifier means, to the comparator means, and to the flip-flop means.

2. A generator for producing a random bit stream as claimed in claim 1, wherein the regulated source means comprises a programmable current source.

3. A generator for producing a random bit stream as claimed in claim 2, wherein the programmable current source comprises a current regulator integrated circuit.

4. A generator for producing a random bit stream as claimed in claim 2, wherein the amplifier means comprises a two-stage Norton-type operational amplifier.

5. A generator for producing a random bit stream as claimed in claim 1, wherein the filter means comprises:
   first filter means for averaging the random bit stream and producing a first feedback signal, the first filter means coupled to the comparator means, the amplifier means, and the flip-flop means; and
   second filter means for averaging a complement of the random bit stream and producing a second feedback signal, the second filter means coupled to the comparator means, the amplifier means, and the flip-flop means.

6. A generator for producing a random bit stream as claimed in claim 5, wherein the first and second filter means each comprise an RC low-pass filter.

7. A generator for producing a random bit stream as claimed in claim 1, wherein the flip-flop means comprises:
   clock means for generating a periodic clock pulse;
   data flip-flop means for receiving the periodic clock pulse and the comparator output signal and for producing an intermediate random bit stream, the data flip-flop means coupled to the clock means; and
   buffer means for receiving the intermediate random bit stream and for producing the random bit stream, the buffer means coupled to the data flip-flop means and to the clock means.

8. A generator for producing a random bit stream immediately upon generator start up, the generator comprising:
   regulated source means for generating a noise signal;
   amplifier means for producing an amplified noise signal from the noise signal, the amplifier means coupled to the regulated source means;
   comparator means for receiving the amplified noise signal and a feedback input and producing a comparator output signal, the comparator means coupled to the amplifier means;
   flip-flop means for receiving the comparator output signal and for producing a random bit stream, the flip-flop means coupled to the comparator means;
   quick start means for ensuring randomness in the random bit stream from generator start up, the quick start means coupled to the amplifier means, the comparator means, and the flip-flop means; and
   filter means for averaging the random bit stream and producing the feedback input, the filter means coupled to the amplifier means, the comparator means, and the flip-flop means.

9. A generator for producing a random bit stream as claimed in claim 8, wherein the regulated source means comprises a programmable current source.

10. A generator for producing a random bit stream as claimed in claim 9, wherein the programmable current source comprises a current regulator integrated circuit.

11. A generator for producing a random bit stream as claimed in claim 9, wherein the amplifier means comprises a two-stage Norton-type operational amplifier.

12. A generator for producing a random bit stream as claimed in claim 8, wherein the filter means comprises:
   first filter means for averaging the random bit stream and producing a first feedback signal, the first filter means coupled to the comparator means, the amplifier means, and the flip-flop means; and
   second filter means for averaging a complement of the random bit stream and producing a second feedback signal, the second filter means coupled to the comparator means, the amplifier means, and the flip-flop means.

13. A generator for producing a random bit stream as claimed in claim 12, wherein the first and second filter means each comprise an RC low-pass filter.

14. A generator for producing a random bit stream as claimed in claim 12, wherein the flip-flop means comprises:
   clock means for generating a periodic clock pulse;
   data flip-flop means for receiving the periodic clock pulse and the comparator output signal and for producing an intermediate random bit stream, the data flip-flop means coupled to the clock means; and
   buffer means for receiving the intermediate random bit stream and for producing the random bit stream, the buffer means coupled to the data flip-flop means and to the clock means.

15. A generator for producing a random bit stream as claimed in claim 14, wherein the quick start means comprises:
   external control means for receiving an external input and producing a control signal; and
   analog gate means for electrically shorting the first and second feedback signals in response to the control signal, the analog gate coupled to the external control means, to the first filter means and to the second filter means.

16. A generator for producing a random bit stream as claimed in claim 14, wherein the quick start means comprises:
   analog gate means for electrically shorting the first and second feedback signals in response to the control signal, the analog gate means coupled to the external control means, to the first filter means and to the second filter means; and
   monostable means for receiving the periodic clock pulse and engaging the analog gate means when the periodic clock pulse is not received, the monostable means coupled to the clock means, and to the analog gate means.

17. A generator for producing a random bit stream as claimed in claim 14, wherein the quick start means comprises:
   external control means for receiving an external input and producing a control signal;
   first diode means for reducing the first feedback control signal to an average signal in response to the control signal, the first diode means coupled between the first filter means and the external control means; and
   second diode means for reducing the second feedback control signal to an average signal in response to the control signal, the second diode means coupled between the second filter means and the external control means.

18. A generator for producing a random bit stream as claimed in claim 14, wherein the quick start means comprises:
   first diode means for reducing the first feedback control signal to an average signal in response to the control signal, the first diode means coupled to the first filter means;
   second diode means for reducing the second feedback control signal to an average signal in response to the control signal, the second diode means to the second filter means; and
   monostable means for engaging the first and second diode means, the monostable means coupled to the first and second diode means.

19. A method for producing a random bit stream in a quick-starting generator comprising the steps of:
   generating a noise signal in a regulated source;
   producing an amplified noise signal from the noise signal in an amplifier;
   producing a feedback signal from a filter;
   receiving the amplified noise signal and the feedback input and producing a comparator output signal in a comparator;
   receiving the comparator output signal in a flip-flop;
   producing a random bit stream from the flip-flop;
   ensuring randomness in the random bit stream from generator start up using a quick-start circuit; and
   averaging the random bit stream.

20. A method for producing a random bit stream in a quick-starting generator as claimed in claim 19, wherein the step of averaging comprises the steps of:
   averaging the random bit stream in a first filter;
   producing a first feedback signal from the first filter;
   averaging a complement of the random bit stream in a second filter; and
   producing a second feedback signal from the second filter means.

21. A method for producing a random bit stream in a quick-starting generator as claimed in claim 19, wherein the step of producing the random bit stream comprises the steps of:
   generating a periodic clock pulse in a clock;
   receiving the periodic clock pulse and the comparator output signal in a data flip-flop;
   producing an intermediate random bit stream from the data flip-flop;
   receiving the intermediate random bit stream in a buffer; and
   producing the random bit stream from the buffer.

22. A method for producing a random bit stream in a quick-starting generator as claimed in claim 19, wherein the step of ensuring randomness comprises the steps of:
   receiving an external input in an external control;
   producing a control signal from the external control; and
   electrically shorting the first and second feedback signals in response to the control signal using an analog gate.

23. A method for producing a random bit stream in a quick-starting generator as claimed in claim 19, wherein the step of ensuring randomness comprises the steps of:
   receiving the periodic clock pulse in a monostable;
   engaging an analog gate with the monostable when the periodic clock pulse is not received; and
   electrically shorting the first and second feedback signals using the analog gate.

24. A method for producing a random bit stream in a quick-starting generator as claimed in claim 19, wherein the step of ensuring randomness comprises the steps of:
   receiving an external input in an external control;
   producing a control signal from the external control;
   reducing the first feedback control signal to an average signal in response to the control signal in a first diode;
   reducing the second feedback control signal to an average signal in response to the control signal in a second diode; and
   engaging the first and second diode in response to the control signal.

25. A method for producing a random bit stream in a quick-starting generator as claimed in claim 19, wherein the step of ensuring randomness comprises the steps of:
   reducing the first feedback control signal to an average signal in a first diode;
   reducing the second feedback control signal to an average signal in a second diode; and
   engaging the first and second diode using a monostable device.

* * * * *